March 26, 1946.    G. E. WADSWORTH    2,397,390
HOT LINE CLAMP
Filed Oct. 25, 1943
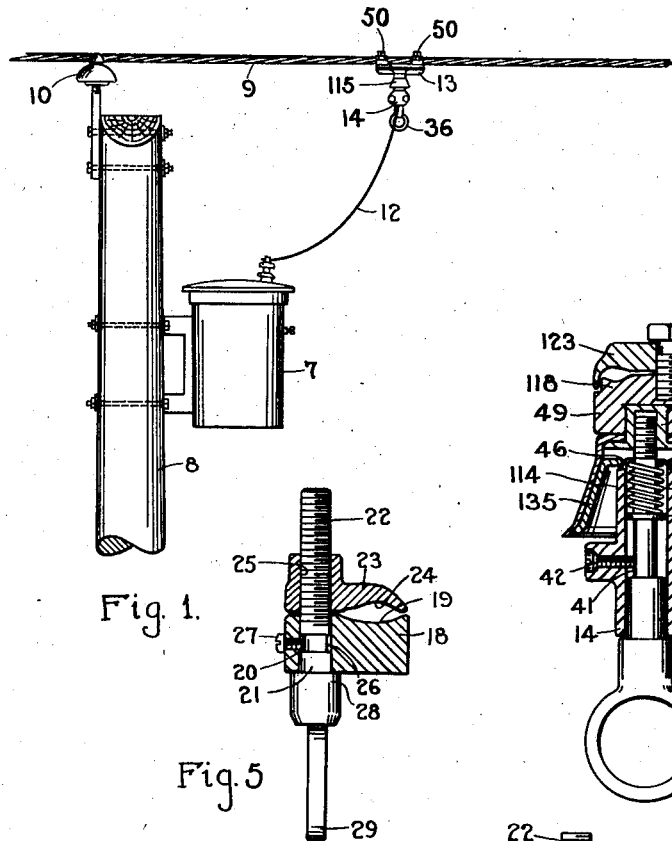
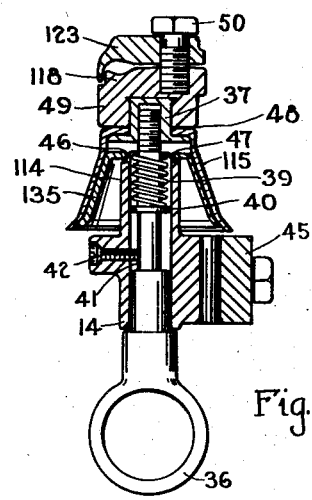
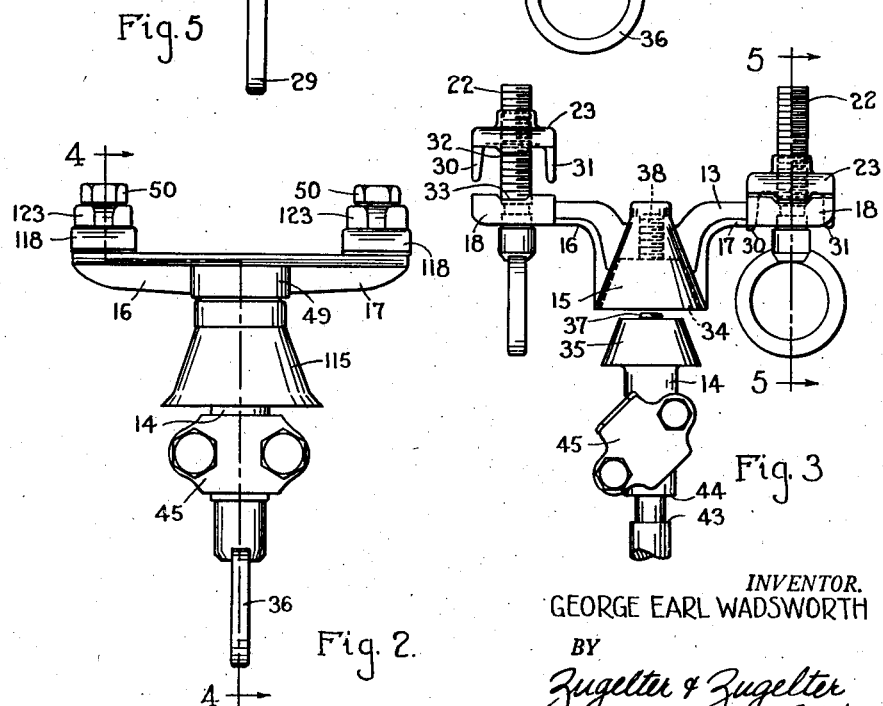
INVENTOR.
GEORGE EARL WADSWORTH
BY
Zugelter & Zugelter
Atty's Patented Mar. 26, 1946

2,397,390

UNITED STATES PATENT OFFICE 2,397,390

HOT LINE CLAMP

George Earl Wadsworth, Erlanger, Ky.

Application October 25, 1943, Serial No. 507,655

12 Claims. (Cl. 173—273)

The present invention relates to an electric transmission line fixture or attachment, commonly referred to as a hot line clamp. The purpose of such a fixture is to make a tap connection from the hot line to a transformer or other piece of equipment located at a distance from the transmission line, the tap connection being so arranged that it may be repeatedly disconnected and restored without injury to the main transmission line, and with due regard to the safety of the lineman or electrician whose duties require him to install or service the electrical equipment.

One of the objects of the present invention is to provide an improved form of hot line clamp which is constructed of two parts, one of which is connected permanently to the transmission line, and the other of which is a connector unit to which a tap wire is attached, the connection between the parts being such as to present many advantages over known forms of clamps.

Another object of the invention is to provide a clamp of the character referred to, which greatly facilitates connection and disconnection of a tap wire, with a high degree of safety and with the elimination of arcing when the connection is made or broken.

Another object is to provide a hot line clamp so constituted that repeated connecting and disconnecting of a tap wire causes no injury or abrasion of the main transmission line.

Another object is to provide a hot line clamp wherein threads and other constituent parts are protected from atmospheric corrosion, and from mechanical failure caused by ice and sleet to which the fixture may be exposed.

The foregoing and other objects and advantages are attained by the means described herein and disclosed in the accompanying drawing, in which:

Fig. 1 is an elevational view of a typical installation including the hot line clamp of the invention.

Fig. 2 is an elevational view of the clamp illustrated by Fig. 1.

Fig. 3 is an elevational view of a modified form of hot line clamp.

Fig. 4 is a cross sectional view taken on line 4—4 of Fig. 2, showing the clamp construction.

Fig. 5 is a cross sectional view taken on line 5—5 of Fig. 3.

As illustrated by Fig. 1 of the drawing, a typical installation may consist of a transformer 7 or other unit of transmission equipment, suitably mounted upon a pole 8 which furnishes also an aerial support for the electric transmission line 9, which in ordinary practice is properly attached to insulator 10, carried by the pole. When the transmission line 9 is charged with high voltage electricity, it is commonly known as a hot line. Under certain circumstances, it is necessary to make a tap wire connection 12 between the hot line and a transformer or other piece of equipment, at intervals along the length of the hot line. Tap connections such as 12 have been effected in the past, by merely providing a suitable clamp upon one end of the tap wire, the clamp carrying means for mechanically fastening it to the hot line. In those instances where the tap wire clamp was bodily fastened to the hot line, and had to be bodily removed from the hot line in its entirety in order to break the tap connection, there resulted the objectionable condition that the hot line became dented or crushed with each reapplication of the tap wire clamp, thereby weakening the hot line and subjecting it to early deterioration, wherever the tap line clamp might have been applied thereto. As will be understood, repeated application of the tap wire clamp at the same location on the hot line, would soon damage the main line to a serious degree, and the practice of some linemen to replace the clamp at different locations along the main line merely aggravated the condition by weakening the main line at a number of locations.

In accordance with the present invention, the hot line clamp is constructed of two parts, one of which is the line unit 13, and the other of which is the connector unit 14. Fig. 3 shows the parts in a disconnected relationship. The line unit as illustrated by Figs. 3 and 5, comprises a central bell or socket member 15 from which the arms 16 and 17 extend outwardly in opposite directions to provide stationary clamping seats 18 to engage the transmission line. The seats may be made concave as indicated at 19, to provide proper seating for the wire or transmission line 9. As illustrated by Figs. 3 and 5, the part 18 may be bored vertically as at 20 to receive the shank 21 of a screw 22, the threaded upper end of which threadedly engages the movable jaw 23 of the clamp. This jaw may be rendered concave where it contacts the transmission line at 24, and will be seen to have an elevating and lowering movement along the threads of screw 22 when the screw is rotated, it being understood that the bore of the movable jaw is internally threaded at 25. The shank of screw 22 preferably is grooved at 26 to receive the inner end of a screw or pin 27 that prevents longitudinal shifting movement of the screw relative to the stationary part 18 of the clamp, and shoulder 28 on the screw is adapted to abut the underface of part 18 in tightening the screw and forcing the movable jaw onto the wire 9.

Screw 22 may be furnished with a suitable head 29, to be grasped by a tool known as a hot line stick, which is commonly employed by linemen for manipulating the screw in mounting or dismounting the line unit portion of the clamp relative to the hot line. The head of the screw may be in the form of a ring as shown, or it may simply be formed as a hexagon bolt head suitably elongated to firmly seat within the socket portion of the hot line stick, this matter of the shape of the screw head being dependent upon the nature or construction of the hot line stick to be used in holding the clamp and securing it to the transmission wire. It may be noted at this point in the description, that the form of clamp illustrated by Fig. 3 will generally be so held by a hot line stick, as to make it possible for the lineman to elevate the line unit of the clamp to the location of the transmission wire, hook the open jaws of the unit onto the wire and then rotate the stick while in engagement with the screw head, to close the jaws and permanently attach the line unit to the wire. Such lifting of the line unit into association with the transmission wire, is accomplished by using the hot line stick, which includes a suitable socket in which the head 29 of the screw is securely held until the connection is completed.

As illustrated in the Fig. 3 drawing view, the movable jaws of the line unit portion of the clamp may be furnished with guide fingers 30—31 adapted for contacting the stationary part 18, to prevent rotation of the movable jaw 23 as the clamp screw is turned for gripping or releasing the line wire. The guide fingers shown at the left of Fig. 3 will not ordinarily be out of contact with the stationary jaw part 18 as illustrated, since it is seldom necessary to open the jaws to the extent indicated.

The open mouth portion of movable clamp 23 may carry a centrally depending lip 32 adapted to seat within a socket 33 of the stationary clamp part 18, to complete the circular contact area of the jaws upon the transmission wire as the jaws are tightened into clamping relationship therewith.

Reference is now made to the bell or socket portion 15 of the line unit. It will be noted that the bell is hollow as indicated by the broken lines 34 to provide a cavity into which may be projected the plug portion 35 formed at the upper end of connector unit 14. The plug may be considered an enlargement of the upper end of the connector unit, providing for an extensive frictional and contacting area to be placed in frictional and conductive contact with the interior of the bell 15. The bell and the plug are to be complementarily tapered, to provide an adequate conductive area for electricity, and a considerable frictional area preventing rotation of the plug within the bell in the tightened condition of the connector unit upon the line unit. Of importance in this connection, is the fact that the generally tapered form of the plug and bell serves as a pre-contact means for the passage of current when the plug is initially projected into the bell, prior to screwing the parts together. The parts are screwed together by rotating the head 36 of screw 37, the upper end of which screw is adapted to threadedly engage an internally threaded bore 38 formed in the fixture above and concentrically with the bell portion 15 thereof. From the foregoing, it will be apparent that a preliminary contact will be made for the passage of current from the bell to the plug before screw 37 enters the threaded bore 38 of the line unit, in the act of applying the connector unit to the line unit, so that no arcing will occur as the screw is driven toward and into the threaded bore of the line unit. When it is considered that the line unit may be suspended a considerable distance overhead, the advantage of providing the bell and plug arrangement for guiding the screw 37 into alignment with bore 38, becomes readily apparent. It will be appreciated also that the connector unit 14, being attached to a hot line stick, will likely contact the bell at an angle, rather than in perfect axial alignment, so that conductive contact will be established prior to entry of the screw into the threaded bore 38.

In order to induce the pre-contact between the bell 15 and plug 35, before the threads of screw 37 can enter the bore 38, screw 37 is normally urged downwardly by means of a spring 39 which applies a downward force to the shoulder 40 of the screw. Beneath the shoulder 40, the screw shank may be reduced in diameter as indicated at 41, to provide a way in which may ride the inner end of a screw 42, the function of which is to limit the longitudinal movement of the screw relative to the body of the connector unit through which the screw extends. Although in the disconnected condition of the connector and line units, the screw is projected downwardly with its shoulder 43 spaced from the body portion at 44, it is necessary only to project it upwardly against the resistance of spring 39 in order to effect the desired connection at 37—38. This upward projection of the screw occurs incidently to insertion of plug 35 into the interior of bell 15, the plug touching the bell before the upper end of the screw enters threaded bore 38. Thus, electrical contact is made before the screw threads are engaged, thereby preventing destructive arcing at the threads. Moreover, the screw is automatically aligned with bore 38, before the threads can be engaged, thereby precluding the possibility of crossing the threads in the effort to apply the connector unit to the line unit.

The character 45 indicates a tap wire connection on the connector unit, which connection may be disposed obliquely to the longitudinal axis of screw 37 as illustrated by Fig. 3, or in the horizontal position as illustrated at 45 of Fig. 2.

It may here be noted that a slight difference exists between the line units and connector units of Figs. 3 and 4. In Fig. 3, the enlarged head 35 is shown as an integral part of hollow housing 14 that supports the connector screw, whereas in Fig. 4 the plug is a separate part, indicated at 135, having its upper center portion attached to the screw housing at 46. This plug 135 may be in the form of a spun cup permanently attached to the screw housing 114. In all other respects, the connector units of Figs. 3 and 4 are identical. It may be noted that the upper end of spring 39 is backed up at 47, where the plug and the shank meet, so that the spring may have the necessary compressive force to constantly urge the screw to the downward or retracted position. The same form of spring arrangement is incorporated in the connector unit 14 of Fig. 3.

As concerns the line unit, it may be noted that the bell 15 thereof (Fig. 3) is cast integrally with the arms 16 and 17, whereas in Figs. 2 and 4 the bell 115 is a spun cup suitably mounted as at 48 upon the central portion 49 of the unit. From the standpoint of service, it is quite immaterial whether the bell and plug be integral parts of the units, or separate parts permanently attached to the units, the only requirements being that the plug be permanently related to the connector unit, while the bell be permanently connected to the line unit in position to receive the plug as and for the purposes specified earlier herein.

The jaw structures of Figs. 2 and 3 are shown in different forms, that of Fig. 3 being of the type used when the line unit is to be hooked onto an existing hot line. In that event, it is impossible for the lineman to closely approach the hot line, and for that reason is required to use a so-called hot line stick in lifting the line unit up to the elevation of the hot line, hook the jaws onto the latter, and then tighten the screws 32 by rotating the hot line stick attached to the ring heads of the screws. As will be understood, the hot line stick has a temporary connection with the rings or heads, so that the stick may be used for tightening both of the movable clamp jaws of the line unit.

In that form of line unit illustrated by Fig. 2, the movable jaws 123 may be drawn toward the stationary jaws 118, and tightened onto the transmission wire, by applying a wrench to the bolt heads 50. Jaws of the character indicated at 118—123 are suitable for use upon line units that are to be attached to transmission wires not charged with electricity, as the lineman may in that event work in close proximity to the uncharged wire with perfect safety.

It should be understood that the plugs and bells on the different forms of hot line clamps will be of standard size, so that the plug of one will fit the bell of the other; the plug 35 of Fig. 3 will fit the bell 115 of Fig. 2, as would be readily evident if Figs. 2 and 3 were drawn on the same scale.

From the foregoing explanation, it will be appreciated that the new fixture herein disclosed possesses various advantages and features of merit over known forms of clamps. It may be inexpensively manufactured, and parts of the two forms of clamp illustrated are made interchangeable, thereby reducing the number of parts to be kept on hand for replacements and repairs. One point of merit that has not been stressed previously, is the protection against corrosion and deterioration afforded the connecting screw that holds the line unit and the connector unit together. It will be seen that said screw, and its threads particularly, are adequately enclosed by the hollow bell arrangement and for that reason corrosion may not be stimulated by atmospheric conditions, nor can sleet and ice interfere with manipulation of the screw.

Whenever the circuit is to be broken through the tap wire, it is necessary only to separate the line unit from the connector unit at the bell by unscrewing the screw 37, whereupon the parts will separate as illustrated by Fig. 3. It is never necessary, for this purpose, to release the transmission wire from the grip of the line unit clamp jaws, and for that reason the transmission wire is subjected to no abuse such as might impair its strength or crush its strands. Moreover, swinging of the tap wire, or any outside forces acting upon it, cannot initiate a loose connection between the line unit and the connector unit, as this is effectively prevented by the extensive frictional clutching area afforded by the enlarged plug seating within the enlarged bell. As this friction is established before the connector screw can enter the line unit bore, in completing the tap wire connection, the driving and tightening of the connector screw cannot possibly induce rotation of the connector unit, and thereby twist or wrap the tap wire about the fixture; nor can such twisting or wrapping of the tap wire occur incident to loosening the screw to break the connection, for the same reason.

Various other important advantages and features of merit have been mentioned throughout the description, and others of lesser concern will become manifest to person skilled in the art to which the invention appertains.

What is claimed is:

1. A clamp of the character described, which comprises in combination, a pair of separable units one including means for attachment thereof to a line wire, and the other including attachment means for a tap wire, threadedly engageable connecting means for said units, and a pair of cooperative metallic bell members arranged for establishing an electrical connection between the units in advance of engagement of said connecting means, to preclude arcing at the connecting means as same are threadedly engaged.

2. A clamp of the character described, which comprises in combination, a pair of separable units one including means for attachment thereof to a line wire, and the other including attachment means for a tap wire, threadedly engageable connecting means for said units, and pre-contact means for establishing an electrical connection between the units in advance of engagement of said connecting means, said pre-contact means comprising a metallic bell socket on one unit and a metallic plug on the other unit to concentrically enter the socket and align the engageable connecting means for engagement.

3. A clamp of the character described, which comprises in combination, a pair of separable units one including means for attachment thereof to a line wire, and the other including attachment means for a tap wire, engageable connecting means for said units, and cooperative metallic plug and socket members on said units making electrical connection between the units in advance of engagement of said connecting means, to preclude arcing at the connecting means as same are engaged, said plug and socket members being enlarged and bearing extensive friction faces cooperating to resist relative rotation of the units from a desired relationship as the connecting means are manipulated for complete engagement.

4. A hot line clamp comprising in combination, a pair of separable units one including securing means for attachment thereof to a transmission line, and the other including securing means for a tap wire, and means for detachably mounting one of said units upon the other in electrically contacting condition, said detachable mounting means including a tapped hole in one unit, and a screw on the other unit having a threaded end for engagement with the threads of said tapped hole, and cooperative means on the units for establishing electrical contact between the units incident to and in advance of driving the screw of the one unit into the tapped hole of the other unit, thereby to preclude destructive arcing at the screw threads in effecting the mounting of the one unit upon the other.

5. A hot line clamp comprising in combination, a pair of separable units one including securing means for attachment thereof to a transmission line, and the other including securing means for a tap wire, and means for detachably mounting one of said units upon the other in electrically contacting condition, said detachable mounting means including a tapped hole in one unit, and a screw on the other unit having a threaded end for engagement with the threads of said tapped hole, and cooperative means on the units for establishing electrical contact between the units incident to and in advance of driving the screw of the one unit into the tapped hole of the other unit, thereby to preclude destructive arcing at the screw threads in effecting the mounting of the one unit upon the other, said electrical contact means comprising a tapered socket on one unit and a correspondingly tapered plug on the other unit for entry into the socket.

6. A hot line clamp comprising in combination, a pair of separable units one including securing means for attachment thereof to a transmission line, and the other including securing means for a tap wire, and means for detachably mounting one of said units upon the other in electrically contacting condition, said detachable mounting means including a tapped hole in one unit, and a screw on the other unit having a threaded end for engagement with the threads of said tapped hole, and cooperative means on the units for establishing electrical contact between the units incident to and in advance of driving the screw of the one unit into the tapped hole of the other unit, thereby to preclude destructive arcing at the screw threads in effecting the mounting of the one unit upon the other, said electrical contact means comprising a tapered socket on one unit and a correspondingly tapered plug on the other unit for entry into the socket, the socket being on that unit which attaches to the transmission wire, and inverted to preclude entry of foreign matter between the socket and the plug.

7. A clamp of the character described, comprising in combination, a line unit including an inverted cup-shaped socket, a threaded bore centrally of the socket, and means on said unit for suspending same from a conductor of electricity, a connector unit adapted for detachable mounting thereof to the line unit, said connector unit comprising a longitudinally bored body having opposite ends, a plug fixedly related to one end of the body and shaped for seating engagement within the socket of the line unit, said plug having an opening at one of its ends in alignment with the bore of the body, a screw reciprocable in the body bore, and having a head end and a threaded end, the threaded end being slidably extensible through the opening of the plug, means associated with the screw for yieldingly urging the screw away from the plug and to a retracted position at which the threaded end of the screw remains substantially wholly within the confines of the plug and body, said threaded end being engageable with the threaded bore of the line unit upon shifting of the screw bodily toward the line unit and rotating it in thread-engaging direction, and means carried by the connector unit body for attachment of a tap wire thereto.

8. A clamp of the character described, comprising in combination, a line unit including an inverted cup-shaped socket, a threaded bore centrally of the socket, and means on said unit for suspending same from a conductor of electricity, a connector unit adapted for detachable mounting thereof to the line unit, said connector unit comprising a longitudinally bored body having opposite ends, a plug fixedly related to one end of the body and shaped for seating engagement within the socket of the line unit, said plug having an opening at one of its ends in alignment with the bore of the body, a screw reciprocable in the body bore, and having a head end and a threaded end, the threaded end being slidably extensible through the opening of the plug, means associated with the screw for yieldingly urging the screw away from the plug and to a retracted position at which the threaded end of the screw remains substantially wholly within the confines of the plug and body, said threaded end being engageable with the threaded bore of the line unit upon shifting to the screw bodily toward the line unit and rotating it in thread-engaging direction, and means carried by the connector unit body for attachment of a tap wire thereto, said plug and socket being correspondingly tapered to induce ready seating thereof, and enlarged in diameter greatly in excess of the screw diameter, to present extensive contacting friction faces opposing relative rotation of the units during and subsequently to joinder thereof by the screw.

9. A clamp of the character described, comprising in combination, a line unit including an inverted cup-shaped socket, a threaded bore centrally of the socket, and means on said unit for suspending same from a conductor of electricity, a connector unit adapted for detachable mounting thereof to the line unit, said connector unit comprising a longitudinally bored body having opposite ends, a plug fixedly related to one end of the body and shaped for seating engagement within the socket of the line unit, said plug having an opening at one of its ends in alignment with the bore of the body, a screw reciprocable in the body bore, and having a head end and a threaded end, the threaded end being slidably extensible through the opening of the plug, means associated with the screw for yieldingly urging the screw away from the plug and to a retracted position at which the threaded end of the screw remains substantially wholly within the confines of the plug and body, said threaded end being engageable with the threaded bore of the line unit upon shifting of the screw bodily toward the line unit and rotating it in thread-engaging direction, and means carried by the connector unit body for attachment of a tap wire thereto, said plug and socket being correspondingly tapered to induce ready seating thereof and to place the threaded end of the screw in axial alignment with the threaded bore of the socket, the socket and plug being in electrically communicative relationship with the line unit and the connector unit, whereby to establish an electrical circuit through said units in advance of entry of the screw into the threaded bore aforesaid, to preclude arcing at the threads.

10. An electric fitting comprising in combination, a line unit including a metallic cup-shaped socket, a threaded bore located centrally of the socket, and a connector unit adapted for detachable mounting thereof to the line unit, said connector unit comprising a longitudinally bored body having opposite ends, a plug fixedly related to one end of the body and shaped for seating engagement within the socket of the line unit, said plug having an opening at one of its ends in alignment with the bore of the body, a screw reciprocable in the body bore, and having a head end and a threaded end, the threaded end being slidably extensible through the opening of the plug, means associated with the screw for yieldingly urging the screw away from the plug and to a retracted position at which the threaded end of the screw remains substantially wholly within the confines of the plug and body, said threaded end being engageable with the threaded bore of the line unit upon shifting of the screw bodily toward the line unit and rotating it in thread-engaging direction, and means carried by the connector unit body for attachment of a tap wire thereto.

11. An electric fitting comprising in combination, a line unit including a metallic cup-shaped socket, a threaded bore located centrally of the socket, and a connector unit adapted for detachable mounting thereof to the line unit, said connector unit comprising a longitudinally bored body having opposite ends, a plug fixedly related to one end of the body and shaped for seating engagement within the socket of the line unit, said plug having an opening at one of its ends in alignment with the bore of the body, a screw reciprocable in the body bore, and having a head end and a threaded end, the threaded end being slidably extensible through the opening of the plug, means associated with the screw for yieldingly urging the screw away from the plug and to a retracted position at which the threaded end of the screw remains substantially wholly within the confines of the plug and body, said threaded end being engageable with the threaded bore of the line unit upon shifting of the screw bodily toward the line unit and rotating it in thread-engaging direction, and means carried by the connector unit body for attachment of a tap wire thereto, said plug and socket being correspondingly tapered to induce ready seating thereof and to place the threaded end of the screw in axial alignment with the threaded bore of the socket, the socket and plug being in electrically communicative relationship with the line unit and the connector unit, whereby to establish an electrical circuit through said units in advance of entry of the screw into the threaded bore aforesaid, to preclude arcing at the threads.

12. A hot line clamp comprising in combination, a pair of separable units one including securing means for attachment thereof to a transmission line, and the other including securing means for a tap wire, separable connection means carried by said units for detachably mounting one of said units upon the other in electrically contacting condition, and cooperative means on the units for establishing electrical pre-contact between the units incident to and in advance of engaging the separable connection means of the one unit with that of the other unit, thereby to preclude destructive arcing at the separable connection means in effecting the mounting of the one unit upon the other, said electrical pre-contact means comprising a tapered socket on one unit and a correspondingly tapered plug on the other unit for entry into the socket.

GEORGE EARL WADSWORTH.